Figures 1, 8:
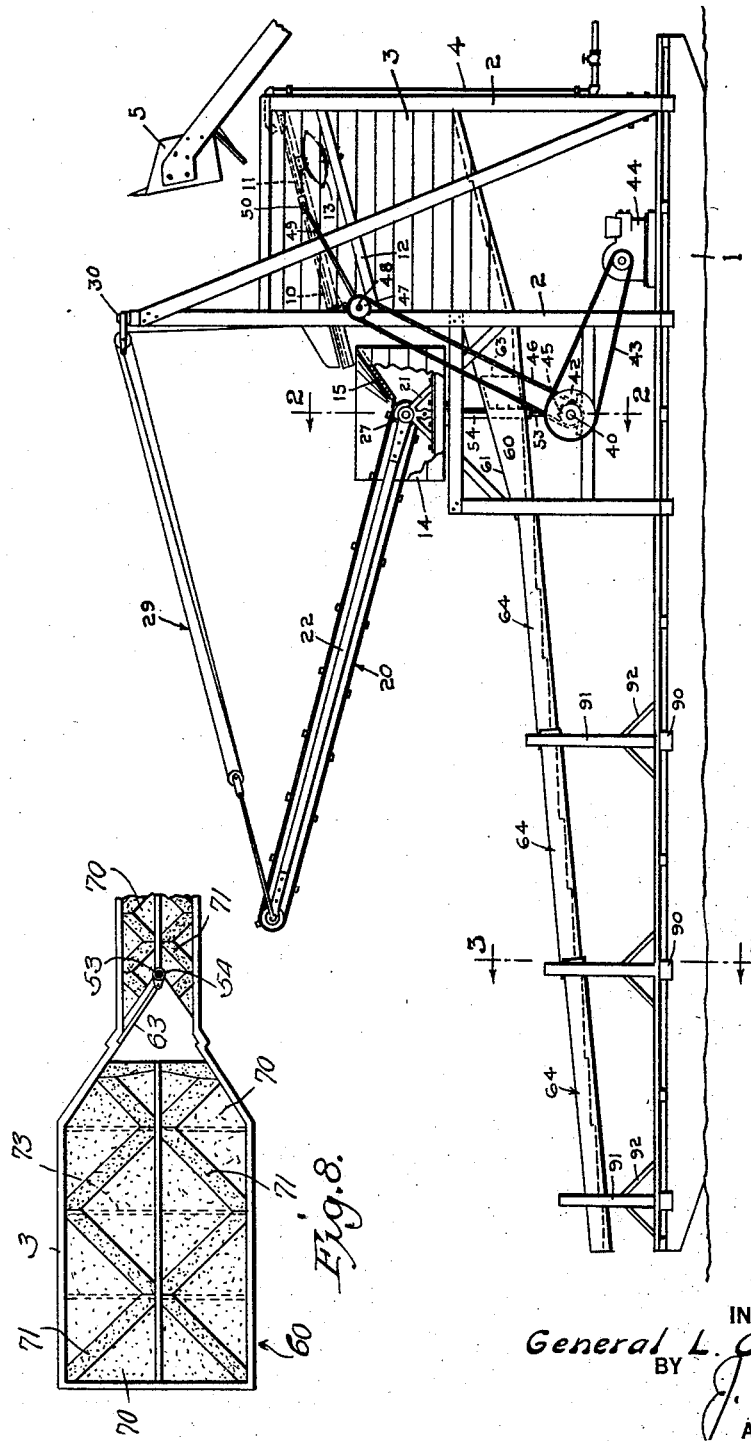

July 21, 1931.  G. L. COVINGTON  1,815,548
GOLD SAVING APPARATUS
Filed June 5, 1928   2 Sheets-Sheet 1

INVENTOR
General L. Covington
BY J. L. Rivers,
ATTORNEY

July 21, 1931.                G. L. COVINGTON                1,815,548
                            GOLD SAVING APPARATUS
                    Filed June 5, 1928    2 Sheets-Sheet 2
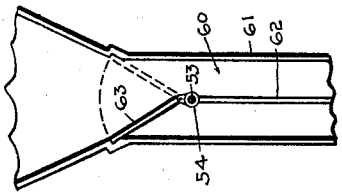
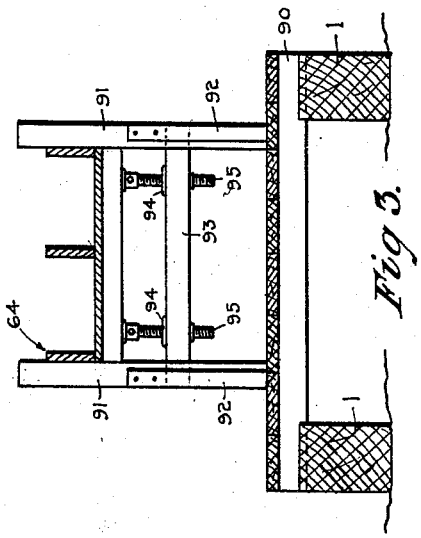
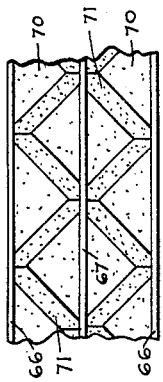
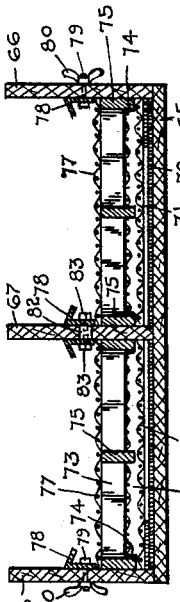
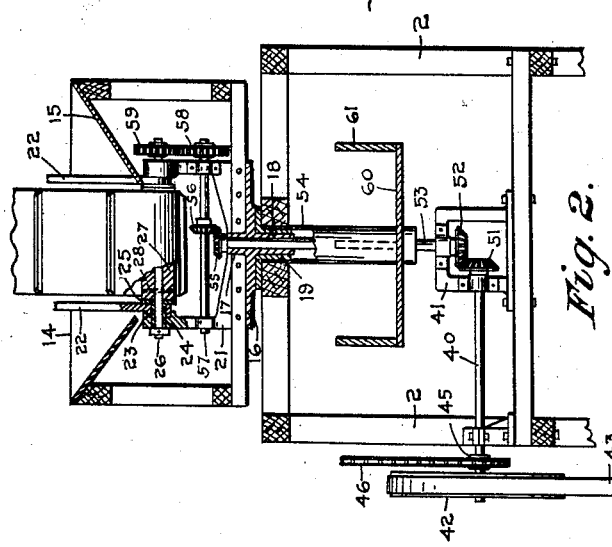
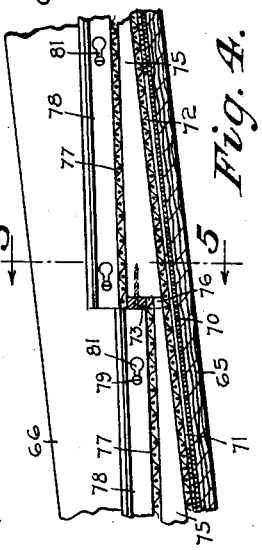
INVENTOR
*General L. Covington*
BY
*J. K. Rivers,*
ATTORNEY Patented July 21, 1931

1,815,548

UNITED STATES PATENT OFFICE

GENERAL L. COVINGTON, OF CHEHALIS, WASHINGTON

GOLD-SAVING APPARATUS

Application filed June 5, 1928. Serial No. 282,898.

My invention has particular reference to an apparatus for saving placer gold, and its objects, generally stated, are, to provide means whereby placer deposits may be received, the tailings segregated therefrom and dumped to any desired location, and the residue run through a system of sluice boxes of special construction, having gold-catching elements, which reclaim the gold contents thereof in a more facile and better way than under former practices when working with similar material; to afford means for effecting a clean-up of the gold so reclaimed without shutting down the apparatus or interfering with the mining or sluicing operations relative thereto; and, to make available an apparatus which handles such auriferous material in a large way, having, in this respect, the effectiveness of a dredge, but requiring much less expense for equipment and operation, and permitting the working of dry ground with the advantages incident thereto.

Other objects will appear as the description of the invention progresses.

In the accompanying drawings—

Figure 1 is a side elevation of the entire apparatus, the conveyor hopper being broken away, and the scoop of a steam shovel being shown to indicate one manner in which the material to be operated on may be dumped into the apparatus;

Fig. 2, a cross section drawn on the line 2—2 of Fig. 1, particularly designed to show the conveyor hopper, mechanism for operating the conveyor belt, and means whereby the hopper and conveyor may be manually rotated;

Fig. 3, a cross section drawn on the line 3—3 of Fig. 1, showing a sluice box, its adjustable supports, and a skid on which the same are mounted;

Fig. 4, a longitudinal section of a sluice box, broken away, particularly showing the arrangement of screens therein, means for detachably securing the screens in place, and gold-catching elements disposed under the screens;

Fig. 5, a cross section of a sluice box, drawn on the line 5—5 of Fig. 4, which includes a riffle of special construction;

Fig. 6, a top view of a sluice box, broken away and screens thereof omitted, illustrating the manner in which sections and strips of carpet for catching particles of gold are located therein;

Fig. 7, a top view of a sluice box, partitioned longitudinally and broken away, the same being the first of a series of similar boxes installed in the apparatus, and a gate for directing a flow of material to either side of the partition; and, Fig. 8, a top view, including the bottom of a hopper, which hopper is designed to take the material to be worked as it is transferred to the apparatus, and a sluice box communicating directly with said hopper, said box being broken away, and the screen elements of said hopper and box omitted, said view illustrating particularly the manner in which said sections and strips of carpet are disposed in said hopper and box, and the locations of certain transversely extending riffle elements in the hopper, as indicated by dotted lines.

Referring more particularly to the drawings, 1 denotes a skid, on which the apparatus is preferably mounted, 2 generally designates a frame, 3 a hopper built into the frame, 4 a standpipe, through which water may be conveyed to the hopper, and 5 the scoop of a steam shovel, for dumping material to be treated into the hopper.

An inclined and reciprocating screen 10, operatively secured to a bed portion 11, is mounted in the frame and to a pair of oppositely disposed supports 12, a spring 13, secured to the bed portion and to each of the supports imparting resiliency to the screen and serving to relieve it of strains incident to the dumping of heavy material thereon.

When said material is dumped on the screen, a heavy charge of water is applied thereto, through the standpipe, which may be connected up with a source of supply, either by a hose or in any other suitable manner. The refuse material, consisting of particles too large to pass through the screen, is thus thoroughly washed and made free of any placer gold which might be adhering thereto, and said material then descends into what I term the conveyor hopper 14. Said hopper is provided with a chute 15, and a base member 16, fixedly secured thereto, having a pair of axially aligned and apertured portions, one of which, denoted as 17, extends upwardly and within the hopper, and the other 18 extends downwardly and fits into a flanged socket 19 disposed within the frame, said member and socket affording a rotatable connection for the hopper with the frame.

As the refuse material enters the conveyor hopper it is directed by the chute to an endless conveyor, generally denoted as 20, one end of which is disposed within the hopper. 21 designates a support for the conveyor, located within the hopper, 22 the frame of the conveyor, and 23 an apertured inner end of each of the parallel side portions of the frame, which is revolubly mounted in the support. 24 denotes a sleeve, having a flange 25, rotatably mounted in each side of the support and adapted to rotate in the adjacent end of the conveyor frame. A shaft 26 is mounted in said sleeves and carries the driving drum 27 of the conveyor, secured thereto at either end by the pin 28, and each sleeve is fixedly secured to the drum by its flange and any suitable fastening element. The drum is thus maintained in position by the support, the sleeves, said ends of the conveyor frame and the pin, the same serving to relieve the shaft of the heavy load to be carried ordinarily by the conveyor and securing the drum against rotation on the shaft.

Blocks and tackle, designated generally as 29, and operatively connected with the forward end of the conveyor and the frame, provide means for supporting the conveyor at its forward end, and, in view of the mounting of the other end of the conveyor, heretofore described, also serve to raise or lower the conveyor, as desired. The rotatable connection of the conveyor hopper with the frame, and a pivotal connection for one of said blocks with the frame, as at 30, as is evident, will permit lateral movement of the conveyor.

Mechanism which simultaneously imparts a reciprocating movement to the screen and revolves the conveyor belt, comprises a horizontal driving shaft 40, journaled in the frame and the support 41, carrying adjacent its outer end a wheel 42 connected up by a belt 43 with a motor 44. It also carries at said end a sprocket wheel 45 which is connected up by the chain 46 to another sprocket wheel 47, secured to a transversely extending shaft 48 journaled in the frame. A pair of arms, each denoted as 49, eccentrically connected with the shaft 48, and pivotally secured to either side of the screen frame as at 50, serve, in cooperation with the connections described, to communicate a reciprocating movement to the screen. A bevel gear wheel 51, secured to the other end of the shaft 40, meshes with a bevel gear wheel 52 secured to the vertical shaft 53, rotatably mounted in the support 41 and in the portions 17 and 18. The shaft 53 is provided along its exposed portion with a casing 54, the purpose of which will be hereinafter described, and at its upper end with a bevel gear wheel 55 disposed within the conveyor hopper. 56 denotes a bevel gear wheel which meshes with the wheel 55 and is secured to the countershaft 57, journaled in the support 21. Said shaft 57 carries a spur gear wheel 58 which meshes with a spur gear wheel 59, secured to the shaft 26, obviously designed, through the instrumentalities described, to transmit a revolving movement to the conveyor belt.

The refuse material, having reached the conveyor, is carried forwardly, and, under the construction heretofore detailed, obviously may be stacked away from the apparatus in locations to best meet the requirements of the user.

The screened material, forced down to the bottom of the hopper 3 by the action of water and the screen, then enters the first of a series of sluice boxes, said box being denoted as 60. The box is supported in the frame and provided with inclined side portions 61, a centrally disposed partition 62 and a gate 63, swingingly mounted, for diverting the flow of said material to either side of the partition, as desired. The casing 54, located around the shaft 53, serves to enclose said shaft as it passes through the box and protect the shaft from the action of said material and water, and at the same time prevent any drippings of oil from the shaft or upper mechanism from gaining access to the box and contaminating the material being treated. In the bottom portions of the hopper 3 and said box, forwardly of the gate, are installed certain riffles, screens and gold-catching elements which will be particularly described presently. A plurality of sluice boxes, generally denoted as 64 and each of identical construction, are operatively supported, as will be hereinafter described, and connect with the first-named box. Each comprises a bottom portion 65, parallel and rectangular side portions 66, and a centrally disposed partition 67, extending the length of the box, said boxes having open ends adapted to telescope with the end of the adjacent box or boxes with which it is associated.

In the bottom of each box, and on either side of the partition, is loosely laid a section of carpet 70, extending the full length of the box, the same being preferably of the Axminster type, and designed to catch and retain gold from the material which passes thereover. On top of said carpet a plurality of strips 71 of the same carpet material are laid loosely and diagonally, as indicated in Fig. 6, for the purpose of breaking up the current in the box and facilitating the deposition of gold particles, the same also acting as auxiliary gold catching and retaining elements. For keeping said carpet in place, for also breaking up said current and to further promote the saving of the gold, a wire screen 72 is placed thereover.

A plurality of riffles are disposed on each side of the partition, and extend over said sections and strips of carpet, and the screen. Each consists of a flat body member 73, preferably of metal, having a pair of dependent legs 74 and three wooden supporting and riffle members 75, provided with inclined upper edges, which are bolted at their forward ends to each side of and centrally of the body member. Said legs and last-named members serve to support the body member and provide a pair of slots 76 between it and the screen. These riffles function in breaking up said current and permitting unworkable material, such as pebbles, or the like, to pass down through the box, leaving the auriferous and workable material in a better condition to be acted upon by said elements. The slots therein prevent the riffles from becoming clogged and possibly causing waste of some of the fine gold which otherwise might flow over the top of the box. The riffles also serve as supports and retainers for a second screen 77, which is seated on top of a riffle, the members 73 and 75 affording adequate support therefor, and its rear end being made conformable to and inserted in the slots presented by the next riffle located rearwardly, as indicated in Fig. 4.

For fastening the last-named screen in place, and at the same time securing the riffle and the elements underneath in operative positions, I provide a pair of retainers each consisting of a section of angle iron 78 having a portion bent at an acute angle to provide a top, which I place over said screen now seated on the riffle, the same extending parallel with the side members 75 of the riffle, and secured to each side of the box by a suitable number of bolts 79 and wing nuts 80, as indicated in Fig. 5. Said retainers are each provided with a plurality of slots 81, enlarged at their rear ends to permit the retainer, when said bolts are loosened, to be moved forwardly and disconnected from the heads of the bolts, without removing said bolts and nuts from their positions in the box. For performing the same function, similar retainers are secured on each side of the central partition of the box, the same being held in place, however, by an interiorly threaded sleeve 82 extending through the partition, and cap bolts 83 screwed therein, thus affording said retainers for each side of the partition which can be installed or removed independently of the other side. As it may be noted, the tops of said retainers are inclined downwardly and toward the bottom of that part of the box in which they are installed, being designed to prevent the accumulation of material thereon. These retainers, detachable as they are, permit the user to quickly demount the screens and riffle preparatory to making a clean-up of the sections and strips of carpet. The aforesaid assembly of riffles, screens, and portions of carpet constitutes one of a series of like parts, which, connected from end to end as indicated in Fig. 4, extend throughout the sluice boxes 64, and into the forward portion of the box 60. In the rearward portion of the box 60 the sections and strips of carpet are changed slightly in outline to make them conformable to the area they are designed to cover, and the portion of the box adjacent to the gate 63 is free of the partition 62 and bare of said carpet obviously to permit unobstructed action of said gate. A like series is also installed in the bottom of the hopper 3, as indicated by the dotted lines in Fig. 1. A centrally disposed partition 67 is also located in the bottom of the hopper and sections and strips of carpet, denoted as 70 and 71 respectively, are disposed in said bottom, for each series, in the same manner as described relative to a sluice box and as illustrated in Fig. 6, and each series is provided with riffles, screens and retainers as described, and as shown in Fig. 4 and Fig. 5. As the bottom of the hopper is designed, preferably, to be of greater width than a sluice box, the riffles and the sections and strips of carpet to be mounted therein on each side of said partition will be made to fit in place and obviously will be somewhat larger in size than the said parts located in a sluice box, but otherwise they are identical in construction.

A plurality of adjustable supports are provided for the sluice boxes 64, each comprising a base 90, and an upright frame 91, secured thereto, having lateral supports 92. A crosspiece 93 is provided with a pair of interiorly threaded sleeves 94 in which are mounted a pair of jack screws 95 designed to contact with a transverse cleat of the box. As the frame extends above either side of the box and in close parallel relation therewith, it will prevent the box from tipping laterally, and the jack screws will support the box vertically and afford means, in cooperation with other of the supports, for adjusting it to the proper inclination. To illustrate the invention I show but three of said boxes, but obviously in practice a larger number will usually be employed.

In making a clean-up, the retainers are removed, when the screens and riffles adjacent thereto may be lifted from the sluice boxes, the sections and strips of carpet containing fine deposits, including the reclaimed gold, then being rolled up and washed, or treated in any other suitable manner, for obtaining said gold. I have found Axminster carpet to be particularly effective for the purposes described as the pile thereof can be spread so as to release the gold particles readily, and the cost of such carpet is not prohibitive for this use.

The gate 63, in cooperation with the aligned central partitions of the sluice boxes, performs a very useful function in that the flow of material may be shut off from one side of said boxes and diverted to the other side, thereby permitting the user to make a clean-up of the side first utilized and still continue sluicing operations in the other, thereby affording continuous operation for the apparatus. While a clean-up of the hopper 3 would necessarily require a shut-down of the sluicing operations, the clean-up will not be required so often as in the case of the boxes, and the same can be effected after the usual working hours, or as may be deemed expedient.

The apparatus is primarily designed for working auriferous deposits, but it is also adapted to be utilized in connection with placer deposits of platinum, tin or other metals, or in working tailings of stamp mills, or the like.

As will be obvious to those skilled in the art, changes in and modifications of the construction described may be made without departing from the spirit of my invention or sacrificing its advantages, hence it is desired that I be not confined to the specific structure set forth.

I claim:

1. In an apparatus of the class described having a sluice box, an assembly of gold-saving elements therefor, comprising a section of carpet disposed in the bottom of the box, a plurality of strips of carpet laid on the section in spaced relation, a screen laid over said strips, a riffle, having a transversely extending and elevated body portion and a plurality of longitudinally extending and spaced supporting and riffle members, disposed on the screen, a second screen laid on top of the riffle, and a plurality of retainers bearing on the last-named screen for detachably securing said elements in superimposed position.

2. In an apparatus of the class described having a sluice box, an assembly of gold-saving elements therefor, comprising a section of carpet, having a pile construction, disposed in the bottom of the box, a plurality of strips of like carpet laid diagonally thereon, a screen laid over said strips, and a riffle detachably mounted over said screen, having a body member elevated above the screen and providing a slot between the member and the screen adapted to permit the passage of small unworkable material therethrough.

3. In an apparatus of the class described having a sluice box, an assembly of gold-saving elements therefor, comprising a section of carpet disposed in the bottom of the box, a plurality of strips of carpet laid on said section in spaced relation, a screen disposed over said section and strips of carpet, and a riffle of rigid construction detachably mounted over said screen and extending transversely of the box.

GENERAL L. COVINGTON.